(12) United States Patent
Carr

(10) Patent No.: US 7,658,422 B2
(45) Date of Patent: Feb. 9, 2010

(54) GARDENING TOOL

(76) Inventor: Paul Carr, 355 Douglas St., Comox, B.C. (CA) V9M 2C6

(*) Notice: Subject to any disclaimer, the term of this patent is extended or adjusted under 35 U.S.C. 154(b) by 268 days.

(21) Appl. No.: 11/325,368

(22) Filed: Jan. 4, 2006

(65) Prior Publication Data
US 2006/0143858 A1   Jul. 6, 2006

(30) Foreign Application Priority Data
Jan. 5, 2005   (CA)   .................. 2,494,271

(51) Int. Cl.
*A01B 1/02*   (2006.01)
(52) U.S. Cl. .......................... 294/49; 294/58
(58) Field of Classification Search ............ 294/17, 294/55, 57, 49, 50.6, 58; 172/371, 372, 381, 172/22, 377, 378; D7/691, 692; D8/10, D8/107, 300; 16/110.1, 421, 422, 426, 430, 16/436; 30/113.1, 315, 352
See application file for complete search history.

(56) References Cited

U.S. PATENT DOCUMENTS

| | | | |
|---|---|---|---|
| 795,876 A * | 8/1905 | Willhide | ............ D8/89 |
| 2,318,277 A * | 5/1943 | Yensen | ............ 294/49 |
| D180,018 S | 4/1957 | Greiner | |
| 4,155,582 A | 5/1979 | Reisner | |
| 4,828,427 A | 5/1989 | Nisenbaum | |
| D305,496 S | 1/1990 | Jasperson | |
| 4,950,013 A | 8/1990 | Yonkers | |
| 5,060,343 A | 10/1991 | Nisenbaum | |
| 5,097,909 A | 3/1992 | Jauhal et al. | |
| 5,159,769 A * | 11/1992 | Odorisio | ............ 294/54.5 |
| 5,165,144 A | 11/1992 | Nisenbaum | |
| 5,581,845 A | 12/1996 | Yang | |
| 5,695,011 A | 12/1997 | Daniels | |
| 5,816,337 A | 10/1998 | Kun-Chuan | |
| D406,219 S * | 3/1999 | Basek | ............ D8/13 |
| 5,921,599 A | 7/1999 | Sun | |
| 5,975,601 A | 11/1999 | Spear et al. | |
| 6,027,153 A | 2/2000 | Marshall | |
| 2004/0078935 A1* | 4/2004 | Tillim | ............ 16/430 |

* cited by examiner

Primary Examiner—Paul T Chin
(74) Attorney, Agent, or Firm—Davis & Bujold, P.L.L.C.

(57) ABSTRACT

A gardening tool includes a shaft having a first end and a second end. A ground working instrument is positioned at the second end of the shaft. A generally T-shaped bifurcated handle is positioned at the first end of the shaft. The handle has two co-planar branches with extremities which are adapted for gripping to facilitate two handed use. The handle is sloped at an angle relative to the shaft. The handle has a recessed crotch portion where the branches meet the shaft. The crotch portion is adapted for gripping to facilitate one handed use.

5 Claims, 4 Drawing Sheets

GARDENING TOOL

This application claims priority from Canadian Application Serial No. 2,494,271 filed Jan. 5, 2005.

FIELD OF THE INVENTION

The present invention relates to a gardening tool with a unique handle, which was developed for use with ground working instruments used by gardeners.

BACKGROUND OF THE INVENTION

A variety of tool handles have been proposed for use with ground working tools used by gardeners, which purport to provide advantages either in term of ground working efficiency or ergonomics. Some tools, such as disclosed in U.S. Design Pat. No. 180,018 (Greiner 1957) and U.S. Pat. No. 4,950,013 (Yonkers 1990), are intended for one handed use. Other tools, such as disclosed in U.S. Pat. No. 4,155,582 (Reisner 1979), U.S. Pat. No. 4,828,427 (Nisenbaum 1989), U.S. Pat. No. 5,060,343 (Nisenbaum 1991), and U.S. Pat. No. 5,165,144 (Nisenbaum 1992), are intended for two handed use.

SUMMARY OF THE INVENTION

According to the present invention there is provided a gardening tool, which includes a shaft having a first end and a second end. A ground working instrument is positioned at the second end of the shaft. A generally T-shaped bifurcated handle is positioned at the first end of the shaft. The handle has two co-planar branches with extremities which are adapted for gripping to facilitate two handed use. The handle is sloped at an angle relative to the shaft. The handle has a recessed crotch portion where the branches meet the shaft. The crotch portion is adapted for gripping to facilitate one handed use.

The tool handle, as described above, is adapted for both one handed and two handed use. It provides significant advantages in terms of both efficiency and ergonomics, as will hereafter be further described.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
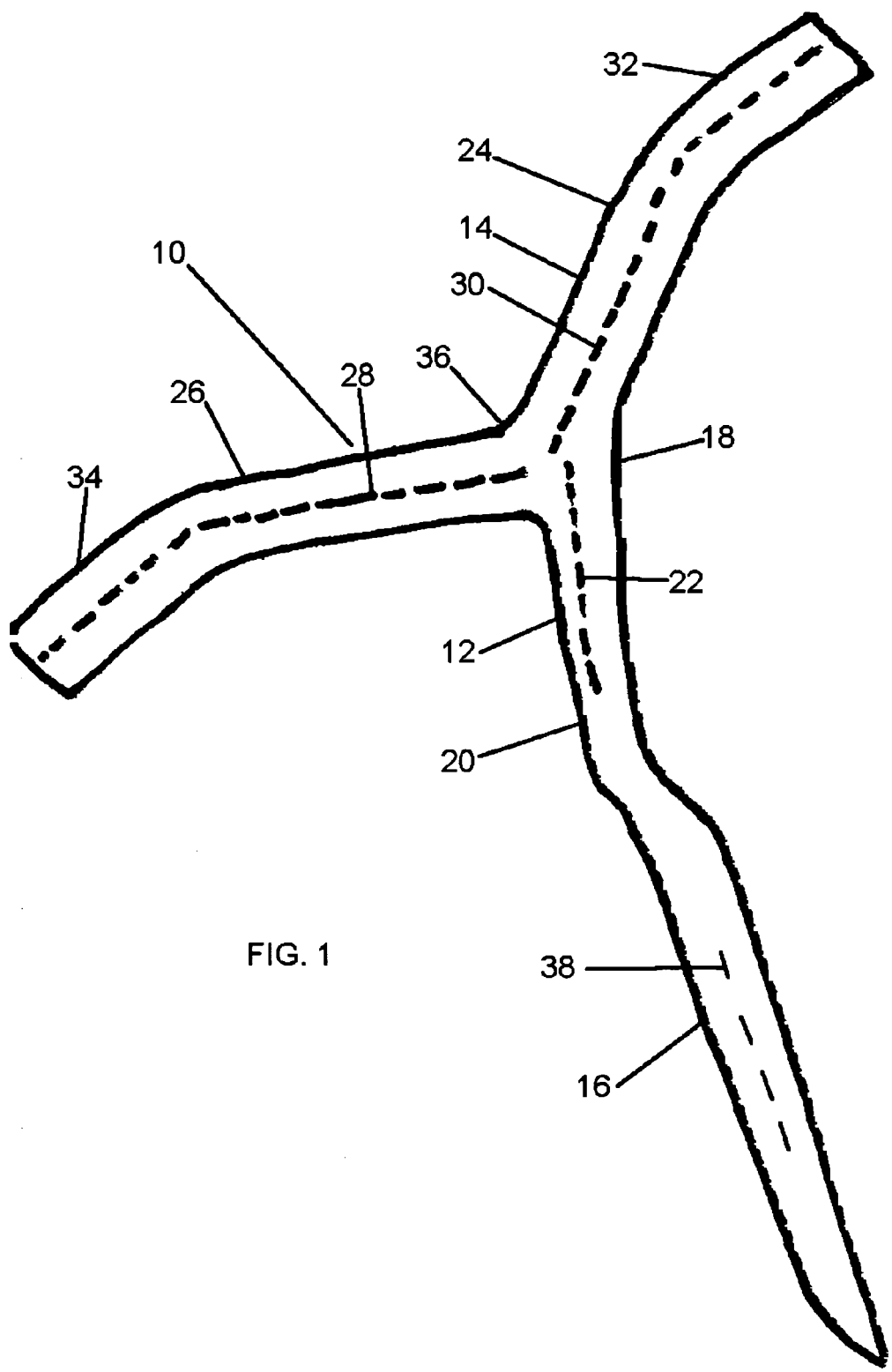
FIG. 1 is a side elevation view of a garden spade with a tool handle constructed in accordance with the teachings of the present invention.

The preferred embodiment, a gardening tool generally identified by reference numeral 10, will now be described with reference to FIG. 1 through 5.

Structure and Relationship of Parts:

Referring to FIG. 1, gardening tool 10 has three portions: a shaft 12, a handle 14 and a ground working instrument 16. Shaft 12 has a first end 18, a second end 20 and an axis 22. Handle 14 is a generally T-shaped bifurcated handle. Handle 14 is positioned at first end 18 of shaft 12. Handle 14 is sloped at an angle relative to shaft 12. As defined by their relative positions along the slope of handle 14, there is an upper branch 24 and a lower branch 26. Lower branch 26 is coplanar with upper branch 24. Lower branch 26 has an axis 28, which is positioned at an angle of between 65 degrees and 105 degrees relative to axis 22 of shaft 12. This range of angles has been selected to provide comfort and support to one's hand during one handed use. An angle less then 65 degrees does not provide adequate support for one's hand during one handed use. The hand is prone to slippage. An angle in excess of 105 degrees is too confining to one's hand during one handed use. The preferred angle is approximately 90 degrees. An axis 30 of upper branch 24 is positioned at an angle of between 140 degrees and 170 degrees relative to axis 22 of shaft 12. An angle greater than 170 degrees does not provide adequate support for one's hand during one handed use. An angle less then 140 degrees is too confining to one's hand during one handed use. The preferred angle is approximately 155 degrees. Each of upper branch 24 and lower branch 26 have extremities 32 and 34, respectively, which are adapted for gripping to facilitate two handed use. For maximum hand comfort, extremities 32 and 34 of the branches are downwardly angled at an angle of between 20 degrees and 40 degrees relative to axis 30 of upper branch 24 and axis 28 of lower branch 26. The preferred angle is 30 degrees. Handle 14 has a recessed crotch portion 36, where upper branch 24 and lower branch 26 meet shaft 12. Crotch portion 36 is being adapted for gripping to facilitate one handed use. It will be appreciated that ground working instrument 16 can take various forms. Although a spade has been chosen for purposes of illustration, ground working instrument 16 could be in the form of a fork or tined cultivator. It could also be in the form of a blade, for use in weeding. Broadly speaking, ground working instrument 16 could take any form for useful in digging, cultivating, weeding, or soil conditioning. Ground working instrument 16 is positioned at second end 20 of shaft 12. Ground working instrument 16 is preferably positioned substantially perpendicular to handle 14. Ground working instrument 16 has an axis 38, which is positioned at an angle of between 5 degrees and 20 degrees relative to axis 22 of shaft 12. This angle positions ground working instrument underneath upper branch 24 of handle 14. The angle will vary with the type of ground working instrument. With the illustrated spade, the preferred angle is approximately 15 degrees. The angle is necessary to properly align ground working instrument 16 with the slope of handle 14.

Operation:

The use and operation of gardening tool 10 will now be described with reference to FIG. 1 through 5.

One Handed Use

Figure 3:
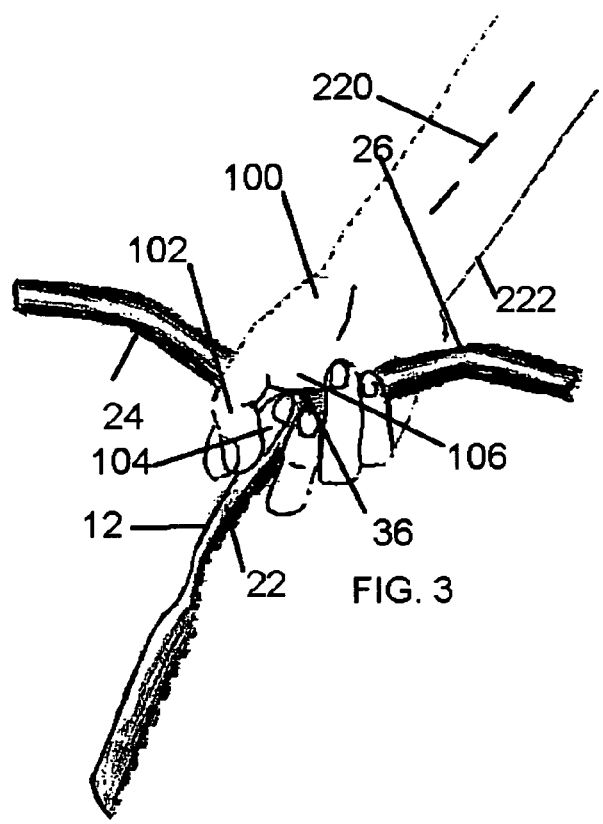
FIG. 3 is a side elevation view of the garden spade illustrated in FIG. 1, demonstrating one handed use.

Referring to FIG. 3, when held by a single hand 100, hand 100 is positioned in crotch portion 36; where upper branch 24 and lower branch 26 of handle 14 meet. Gardening tool 10 sits in the web of hand 100 between the thumb 102 and forefinger 104, with heel 106 of hand 100 applying a downward force along axis 22 of shaft 12. This hand position also allows the user to apply rotational forces around axis 22 of shaft 12, to cultivate the soil.

This single handed use has an ergonomic advantage due to the relatively neutral position of the wrist. This position minimizes strain on the structures of the wrist (carpal bones, joints, ligaments, and connective tissue). It also allows the user to deliver increased downward force to gardening tool 10, as flow as axis 220 of the user's forearm 222 is in alignment with axis 22 of shaft 12. Prior art handles required the user to position his or her wrist in ulnar flexion, which exerts a strain on the structures of the wrist. The one handed position illustrated, negates the need for gripping strength of the fingers around a handle, as the main downward force is transferred to the tool through heel 106 of hand 100. This greatly reduces hand strain and fatigue.

Two Handed Use

Figure 4:
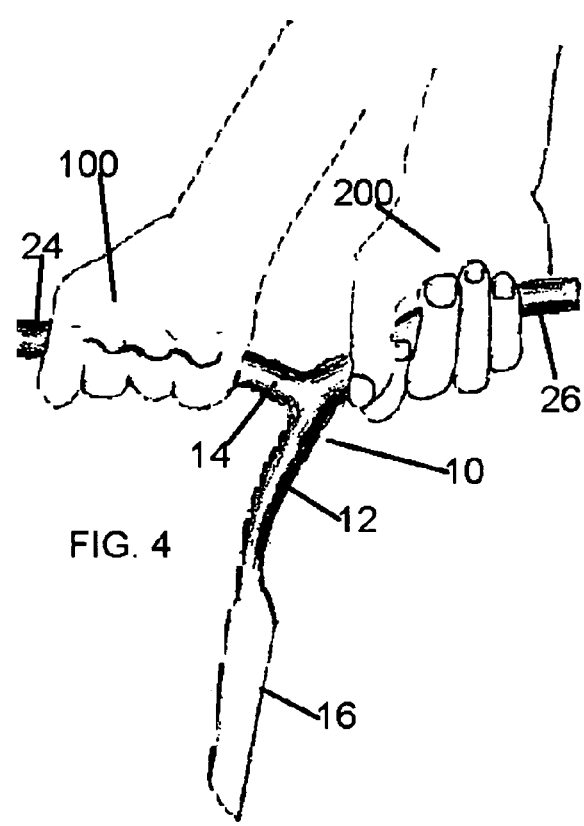
FIG. 4 is a side elevation view of the garden spade illustrated in FIG. 1, demonstrating two handed use.

Referring to FIG. 4, two handed use may involve varied hand positions, with second hand 200 assisting hand 100, with placement on either upper branch 24 or lower branch 26. Chosen for illustration is a hand position in which hand 100 is positioned on upper branch 24 and hand 200 is positioned on lower branch 26. This permits hands 100 and 200 to exert downward pressure in a prying, levering or rotational motion. A rotational motion, where the tool is "spun" while inserted in the ground, results in the scribing of a "plug" of earth, which can be removed as a single unit. This allows the user to plant bulbs or a small potted plant into the newly formed hole.

The use of two hands allows the user to distribute more weight over both hands and arms, thereby increasing downward force and decreasing strain on the limbs. The handle configuration allows both rotational and levering motions to cultivate and loosen soil, dig up plants and remove small rocks.

Use as a Hoe

Figure 2:
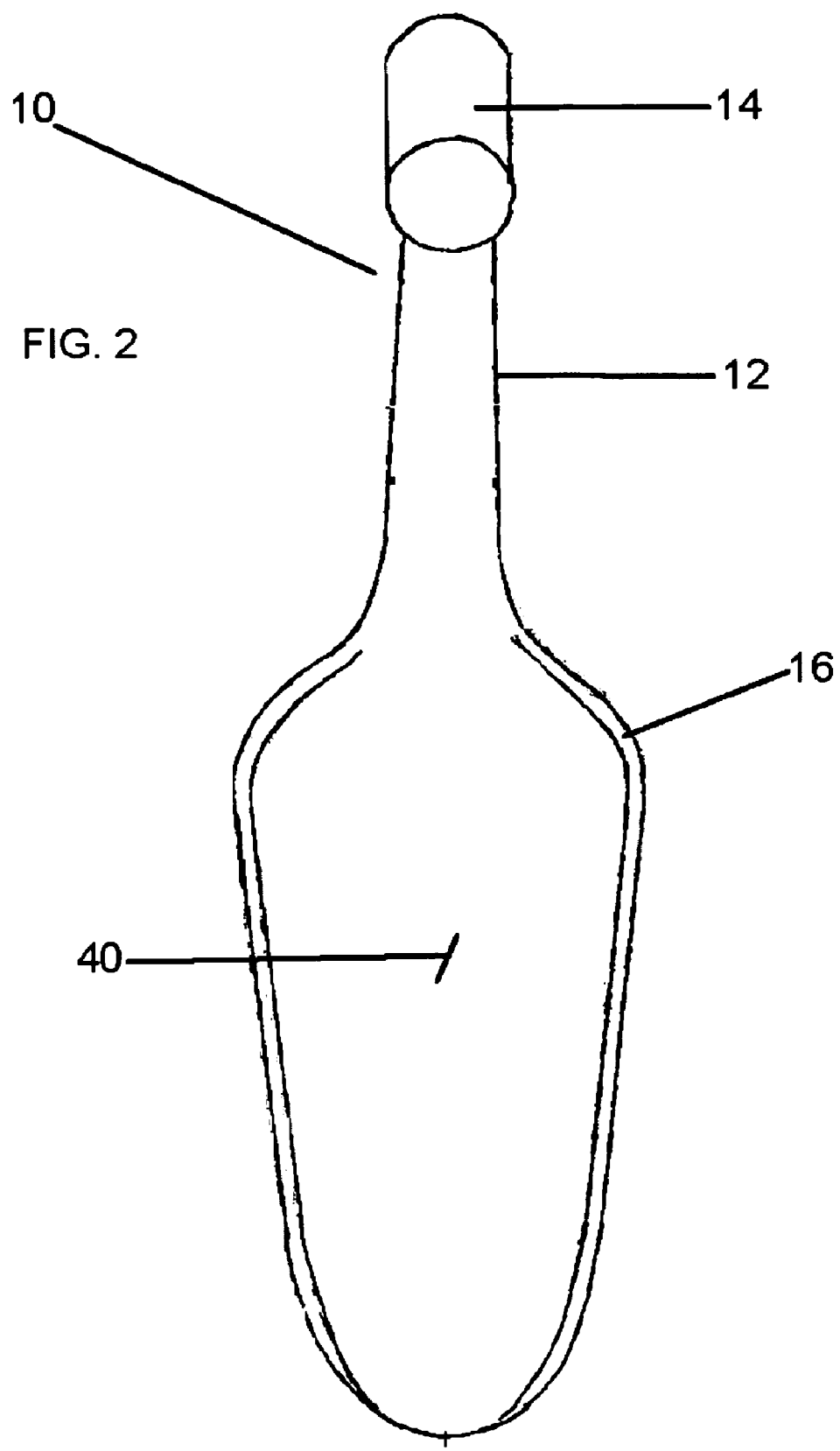
FIG. 2 is a front elevation view of the garden spade illustrated in FIG. 1.
Figure 5:
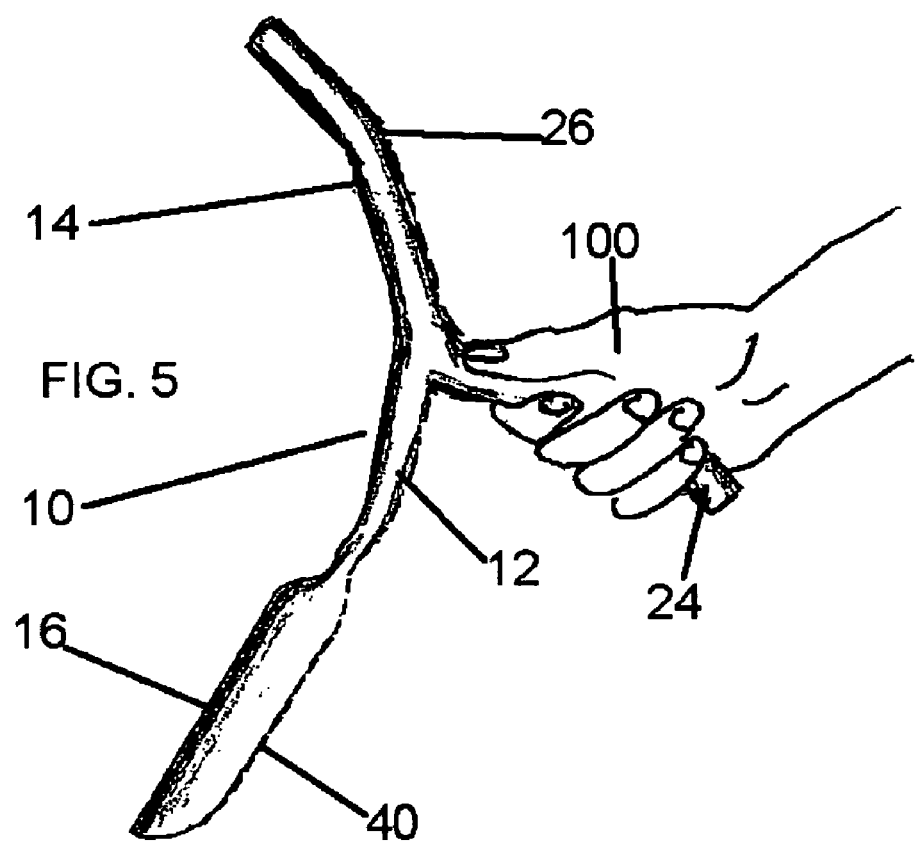
FIG. 5 is a side elevation view of the garden spade illustrated in FIG. 1, demonstrating an alternative form of one handed use as a hoe.

Referring to FIG. 2, ground working instrument 16 is a spade with a concave face 40. Referring to FIG. 5, gardening tool 10 can be turned, so that concave face 40 of ground working instrument 16 is facing the user. By gripping upper branch 24 firmly, gardening tool 10 can be used as a hoe to hack and cultivate the soil.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. An apparatus, comprising:
a shaft having a first end, a second end and an axis;
a bifurcated handle positioned at the first end of the shaft, the handle being sloped at an angle relative to the shaft and having an upper branch and a lower branch which is vertically coplanar with the upper branch when the shaft is in a vertical orientation, an axis of the lower branch being positioned at an angle of between 65 degrees and 105 degrees relative to the axis of the shaft and an axis of the upper branch being positioned at an angle of between 150 degrees and 170 degrees relative to the axis of the shaft, each of the upper branch and the lower branch having coplanar and opposed extremities which are adapted for gripping to facilitate two handed use, the extremities of the branches being angled at an angle of between 20 degrees and 40 degrees toward the second end of the shaft relative to the axis of the upper branch and the axis of the lower branch, the handle having a recessed crotch portion where the upper branch and the lower branch meet the shaft, the crotch portion having a vertically unobstructed grip portion to facilitate one handed use and the crotch portion being substantially axially aligned with the axis of the shaft; and
a ground working instrument positioned at the second end of the shaft, the ground working instrument being positioned substantially perpendicular to the handle, and the ground working instrument having an axis which is positioned at an angle of between 5 degrees and 20 degrees relative to the axis of the shaft, angled underneath the upper branch of the handle.

2. The apparatus as defined in claim 1, wherein the axis of the lower branch is positioned at an angle of approximately 90 degrees relative to the axis of the shaft.

3. The apparatus as defined in claim 1, wherein the axis of the upper branch is positioned at an angle of approximately 155 degrees relative to the axis of the shaft.

4. The apparatus as defined in claim 1, wherein the extremities of the branches are angled at an angle of approximately 30 degrees toward the second end of the shaft relative to the axis of each branch.

5. The apparatus as defined in claim 1, wherein the axis of the ground working instrument is positioned at an angle of approximately 15 degrees relative to the axis of the shaft.

* * * * *